United States Patent [19]

Crawford

[11] Patent Number: 5,593,469

[45] Date of Patent: Jan. 14, 1997

[54] EXHAUST GAS SCRUBBER

[75] Inventor: Steve Crawford, Chilliwack, Canada

[73] Assignee: MEC Systems, Inc., Canada

[21] Appl. No.: 569,692

[22] Filed: Dec. 8, 1995

[51] Int. Cl.$^6$ ............................................. B01F 3/04

[52] U.S. Cl. ..................... 55/228; 261/111; 261/5; 261/67; 261/DIG. 46

[58] Field of Search .................. 261/111, DIG. 46, 261/5, 67; 55/228

[56] References Cited

U.S. PATENT DOCUMENTS

| | | |
|---|---|---|
| 1,169,764 | 2/1916 | Brassert . |
| 1,467,184 | 9/1923 | Mathesius ............... 261/111 |
| 2,239,936 | 4/1941 | Simons .................. 261/111 |
| 2,856,171 | 10/1958 | Otto .................... 261/111 |
| 3,322,409 | 5/1967 | Reed .................... 261/111 |
| 3,751,017 | 8/1973 | Lemmens ................. 261/111 |
| 3,765,659 | 10/1973 | Reilly .................. 261/111 |
| 3,956,435 | 5/1976 | Svensson et al. ......... 261/111 |
| 4,432,914 | 2/1984 | Schifftner .............. 261/111 |

*Primary Examiner*—Tim R. Miles
*Attorney, Agent, or Firm*—Myers, Liniak & Berenato

[57] ABSTRACT

A misting assembly for an exhaust gas scrubber tower which includes an elongated central member, a plurality of perforated baffle plates affixed to the elongated central member at spaced apart distances thereto such that the perforations from each baffle plate are out of alignment with those of the next higher baffle plate. An inner tubular ring and an outer tubular ring are affixed to each baffle plate wherein the diameter of the inner tubular ring and of the outer tubular ring are different from the diameters of the inner and outer tubular rings of the other baffle plates. Spray nozzles are affixed to each ring at regular radially spaced apart locations around each of said inner and outer rings such that the integrated density of fog generated by said spray nozzles over all of said baffle plates is substantially uniform.

11 Claims, 6 Drawing Sheets

5,593,469

1
EXHAUST GAS SCRUBBER

FIELD

The present invention relates to a scrubber for cleaning exhaust gases and dust particulates of unwanted materials removable by exposure to a liquid spray.

BACKGROUND

There are many different types of known washer-scrubbers. These include plate column scrubbers, stationary packing scrubbers, moving bed scrubbers, fibrous packing scrubbers, preformed spray scrubbers, etc. The use of baffles and sprays has been disclosed in a number of patents. U.S. Pat. No. 1,169,764 issued to Brassert discloses a method of gas washing which uses a baffle plate having an array of circular holes radially arranged in circles of increasing diameter and four spray heads around the periphery of the baffle plate at 90 degrees to each other. U.S. Pat. No. 1,467,184 issued to Mathesius discloses the use of 3 sets of baffles with two baffle plates in each set. Each baffle plate consists of four grills with each grill having upwardly inclined sides inclined oppositely to the grills immediately above and/or below. The spray heads are heads are mounted on the wall of the tower below each set of baffles and are directed from the sides of the tower towards the center and upwardly at an average angle of about 45 degrees with the horizontal at the lowest baffle in each set.

U.S. Pat. No. 3,765,659 issued to Reilly discloses a series of horizontally disposed, vertically spaced apart pairs of baffle plates with the holes of one plate of the pair underlying solid areas of the next higher plate. The hole diameters decrease and the number increase from one pair to the next higher pair so that the total area of the holes remains the same. The spray heads are mounted heads directed vertically beneath each pair of plates. The spray pattern, in combination with the hole size and positioning, determine the efficiency of scrubbing an exhaust gas. If one sprays with droplets that are too large then the efficiency of scrubbing is reduced dramatically. Most existing systems spray with droplets of 400 microns and larger. If the holes are too small then there is a risk of blockage by particles and sludge. If they are too large then more particulate is lost and the scrubbing efficiency is reduced.

Another important factor in the design of a scrubber is cost. For example, Reilly discloses the use of pairs of baffle plates with spray applied only to the bottom plate. The top plate of each pair has no spray applied to it and, thus, would tend to clog up with sludge. Moreover, the sprinkler arrangement is affixed to the walls of the tower heads and is expensive and not easily installed or serviced. Finally, Reilly and the other above-mentioned patents all appear to employ spray nozzles that produce droplets of 400 microns or larger and so are not capable of efficient trapping of the particulates. Many conventional systems attempt to compensate for the large spray size by flooding the scrubbing chamber with fog or spray in order to trap more of the particulate. However, excessive fog or spray merely produces water droplets which again dramatically reduce the collection efficiency.

Accordingly, it is an object of the invention to provide an improved scrubber.

SUMMARY OF THE INVENTION

According to the invention there is provided a misting assembly for an exhaust gas scrubber tower, which includes an elongated central member, a plurality of perforated baffle plates affixed to said elongated central member at spaced apart distances thereto such that the perforations from each baffle plate are out of alignment with those of the next higher baffle plate, and an inner tubular ring and an outer tubular ring affixed to each baffle plate wherein the diameter of the inner tubular ring and of the outer tubular ring are different from the diameters of the inner and outer tubular rings of the other baffle plates. Spray nozzles are affixed to each ring at regular radially spaced apart locations around each of said inner and outer rings such that the integrated density of fog generated by said spray nozzles over all of said baffle plates is substantially uniform.

The assembly of baffle plates, spray nozzles and mist eliminator plate can be mounted as a single assembly inside a gas tower. The high pressure nozzle lines are each of a different diameter than the other nozzle lines so that no two high pressure nozzle lines are vertically aligned. The spray nozzles themselves are aligned with the direction of flow of the gas. Mounting the baffle plates to a central elongated member allows the baffle plates and high pressure nozzle lines to be fabricated as a single assembly and to be inserted into and affixed inside a gas tower, smoke stack or commercial chimneys as a single unit. Such a feature considerably simplifies construction. By staggering the water lines, the spray nozzles on each baffle plate cover a slightly different area as viewed from the top so that the whole of the area is covered without needless redundant spray heads and without having to filter excessive amounts of water.

Preferably, spigots are welded to each of the inner and outer rings and the nozzles are removably, threadedly coupled to the spigots. By using threaded spigots, on needs only unscrew a nozzle head to change it. Moreover, the nozzles are mounted out of the flow line of water in the tubular rings, thereby avoiding pressure loss if the valves were in the line of flow. The nozzles have orifices sized so as to produce spray with a particulate size of less than 30 microns for the nozzle pressure range used. The spray nozzles operate at pressures in the range of 600 to 2,000 psi and have nozzle orifice diameters in the range of 0.004 to 0.008 inches. Existing systems use nozzle pressures in the range of only 40 to 160 psi. The orientation of the nozzles is preferably in the direction of flow of the spray.

In another aspect of the invention there is provided a gas scrubber which includes a gas tower and a misting assembly mounted inside the gas tower. The misting assembly includes an elongated central member, a plurality of perforated baffle plates affixed to the elongated central member at spaced apart distances thereto such that the perforations from each baffle plate are out of alignment with those of the next higher baffle plate, an inner tubular ring and an outer tubular ring affixed to each baffle plate wherein the diameter of the inner tubular ring and of the outer tubular ring are different from the diameters of the inner and outer tubular rings of the other baffle plates and spray nozzles affixed to each ring at regular radially spaced apart locations around each of the inner and outer rings such that the integrated density of fog generated by the spray nozzles over all of the baffle plates is substantially uniform. The gas scrubber also includes an exhaust fan mounted atop said gas tower operative to draw gas up through said tower and out the top and a fog pump coupled to a water source and having an outlet coupled to the inner and outer nozzle line rings and operative to develop an outlet pressure in the range of 600 to 2,000 psi.

The gas scrubber may advantageously include a plurality of zone valves intermediate the outlet of the fog pump and each of the inner and outer nozzle line rings on the baffles coupled to a corresponding one of the zone valves so that water can be supplied selectively to respective ones of the baffle plates. Thus, as gas flow is initially developed at a relatively low rate, the spray nozzles on the baffle plate that sprays into zone 1 is initiated. As flow increases, spray is initiated into zone 2 and then zone 3, etc. until spray in all 5 zones is developed. Such selective spraying conserves energy by using only as much spray as is required.

A slump tank may be located at a bottom of the tower, a recirculating pump coupled to an outlet of sump pump, a filtration system coupled to an output of the recirculating pump, a water storage tank having an outlet line coupled to a booster pump, coupled to a second filtration system, then coupled to the fog pump and an inlet coupled to an outlet of the first filtration system. By providing a closed or nearly closed water system, water is conserved and the plant may be located where only low flow rates of water or stored water are available. Moreover, since filtering is required, no polluted water is released into the environment.

BRIEF DESCRIPTION OF THE DRAWINGS

The invention may be best understood by reference to the detailed description which follows, in conjunction with the accompanying drawings, wherein.

DETAILED DESCRIPTION WITH REFERENCE TO THE DRAWINGS

Figure 1:
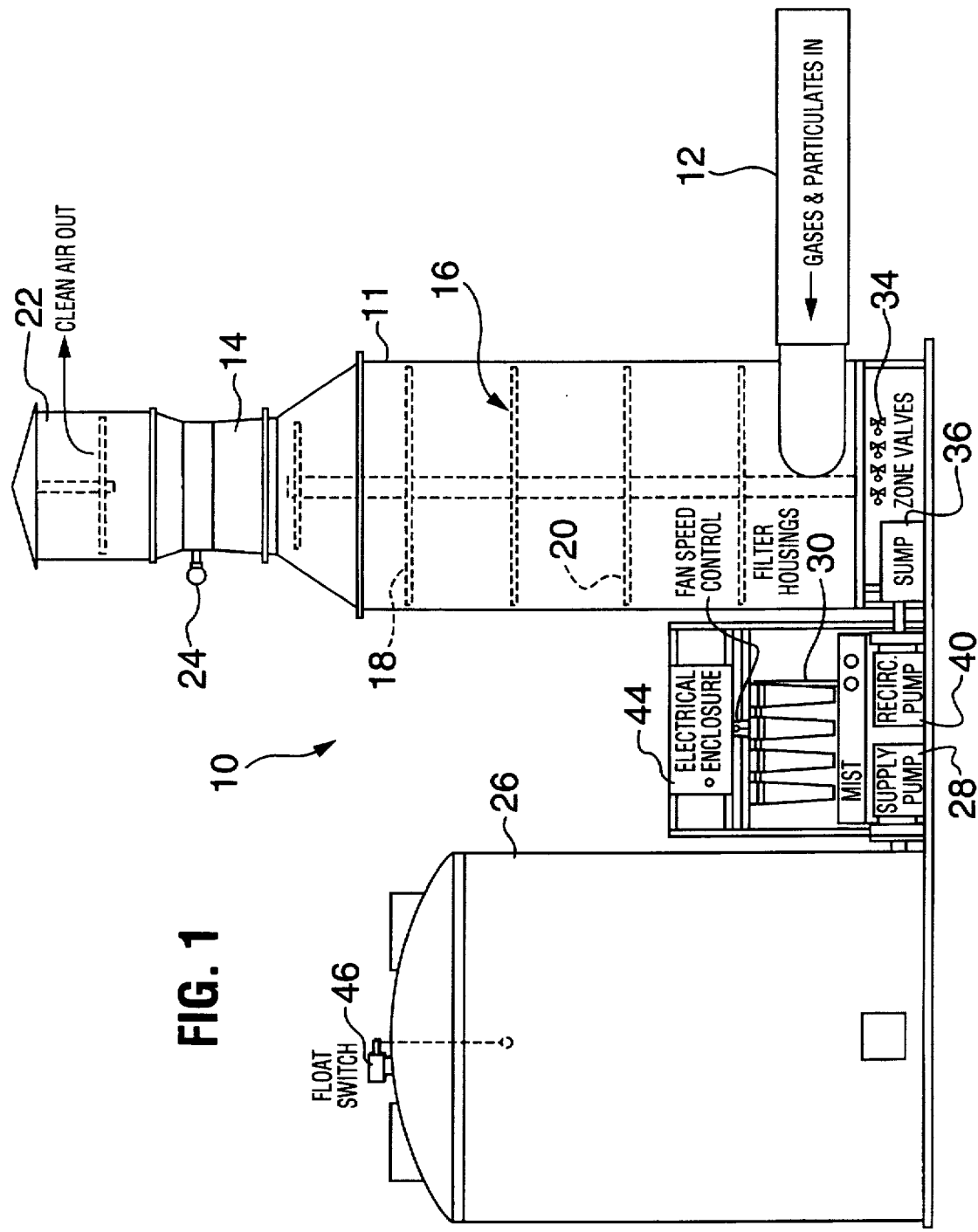
FIG. 1 is a schematic view of the gas scrubber showing the principal components.

Referring to FIG. 1, an exhaust gas and dust scrubber system 10 consists of a gas tower 11 at the base of which is an exhaust gas inlet pipe 12 and near the top of which is a hydraulic fan 14. A misting or tray tower assembly 16 consisting of baffle plates 18 and spray nozzles 20 is mounted inside of the tower 10. The zones of space between the baffle plates 18 are labeled 1 to 5. A clean air vent 22 is located atop the gas tower 10. Below the clean air vent 22 there is mounted a proximity sensor 24 which senses the speed of the fan blade rotation, thereby dictating the CFM of flow of gas through the chamber. Water for the operation of the scrubber system 10 is stored in a storage tank 26 and supplied to the misting assembly 16 by a supply pump 28 through a set of filters 30, to a high pressure fog pump 32 (shown in FIG. 2) and through a set of zone solenoid valves 34 and manually operated ball valves. The pressure developed by the fog pump is between 600 and 2,000 psi delivered down a ½ inch stainless steel tube. Waste water from the misting assembly 16 is collected at the bottom of tower 11 and directed to a sump tank 36. A float switch 38 on the sump tank 36 activates a recirculating pump 40 coupled to the sump tank 36 to pump water out of the latter to a set of filters 42 and back to storage tank 26. A check valve 31 prevents backflow from the storage tank 26 to the sump tank 36. A float switch 46 atop storage tank 26 monitors the level of water in the latter and when the level falls below a preset level, float switch 46 switches and causes an inlet solenoid 48 to open and admit fresh water to flow into storage tank 26 and fill the tank until float switch again switches off the water inlet solenoid 48. Electrical enclosure 44 houses the electrical components which supply power to the pumps, motors and solenoid valves.

Figure 2:
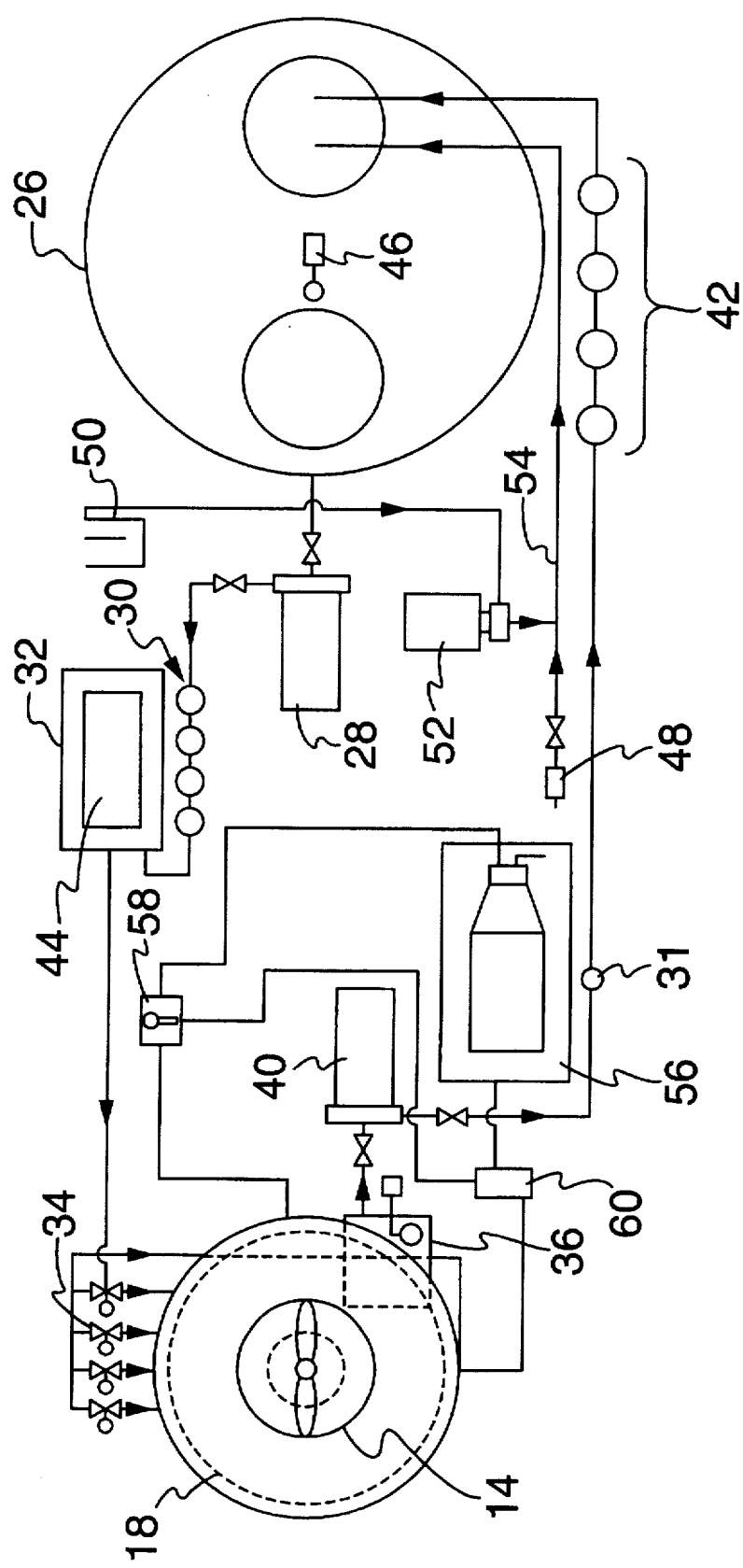
FIG. 2 is a schematic diagram of the gas scrubber system.

A detailed flow diagram showing the operation of the exhaust gas scrubber system 10 shown in FIG. 2. Any desired additives such as odor neutralizing agents may be added to the water by pumping them from additive tank 50 by injector pump 52 into inlet line 54 and into storage tank 26. Most of the components of FIG. 2 have been discussed with reference to FIG. 1 above. The hydraulic fan 14 is driven by hydraulic fluid pumped by a hydraulic pump and tank 56 with fluid flow controlled by a fans speed control valve 58. After passing through the hydraulic fan 14 the hydraulic fluid is cooled in oil cooler 60 before returning to hydraulic pump and tank 56.

In operation, when proximity sensor 24 detects the fan speed increasing it activates the first solenoid of five solenoids 34 coupled to the first zone of spray nozzles 20. As the fan speed is increased, the proximity sensor 24 activates zones 2 to 5 until all have been activated. The fog pump 32 begins to pump when the first zone is activated on startup. Water entering the fog pump 32 is filtered by filters 30 to eliminate any fine particles that would otherwise plug the spray nozzles 20. The spray nozzles 20 are selected to have low volume flow rates and very high rates of forward discharge velocity which causes high turbulence and results in extremely uniform particle distribution of 5 to 20 microns with a maximum of 30 microns. The nozzle diameter is between 0.004 and 0.008 inches with a flow rate at operating pressure of 0.0128 to 0.0214 gal/min.

Figure 3:
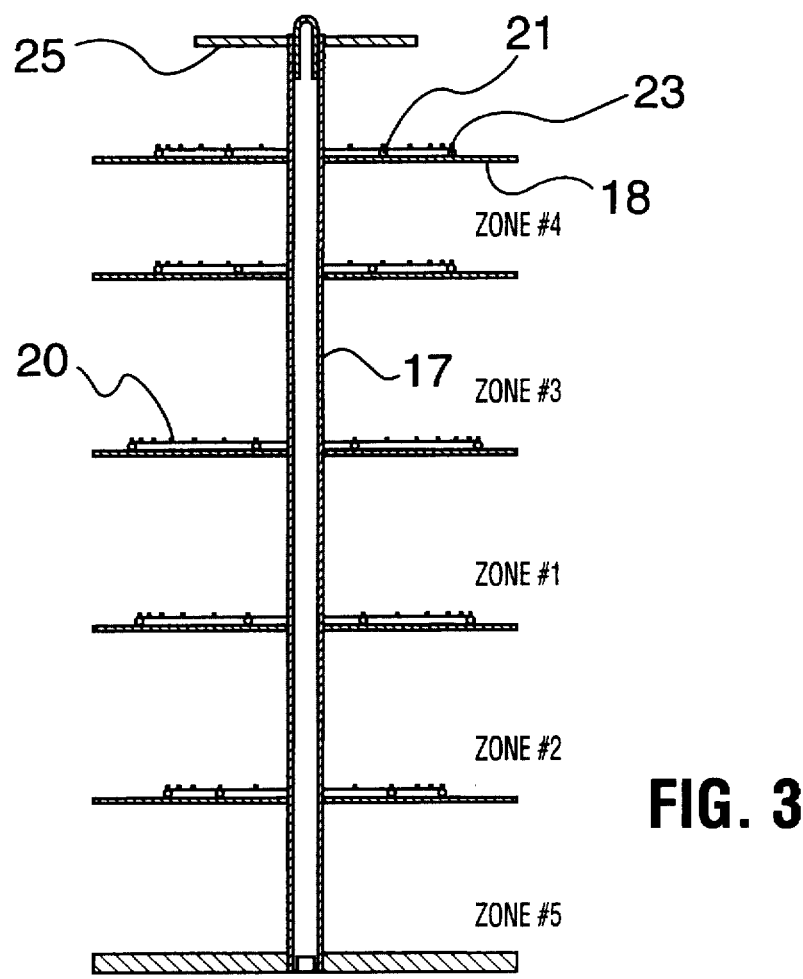
FIG. 3 is an elevation view of the misting assembly.

Referring to FIG. 3, the misting assembly 16 consists of a central shaft 7 to which there is affixed at spaced apart intervals a series of baffle plates 18. On top of each baffle plate 18 is an inner 21 and an outer 23 ½ inch stainless steel tubular ring (see FIG. 5) with spray nozzles 20 affixed at equal radial spacings around each ring. The diameters of the rings of each baffle plate are different than those of any of the other baffle plates such that when integrated over all levels there is a uniform distribution of mist or fog over the cross sectional area of the tower 11. A deflector plate 25 is located at the top of the misting assembly 16 which reduces the amount of escaping fog by condensing the fog so that the condensation falls to the bottom of the misting assembly 16. Each plate 11 has a different hole pattern or orientation which deflects the gases or particulates in a different direction at each level of the plates. This maximizes the path length of each particle and, therefore maximizes the likelihood that it will be captured or impacted by a fog particle.

Figure 4:
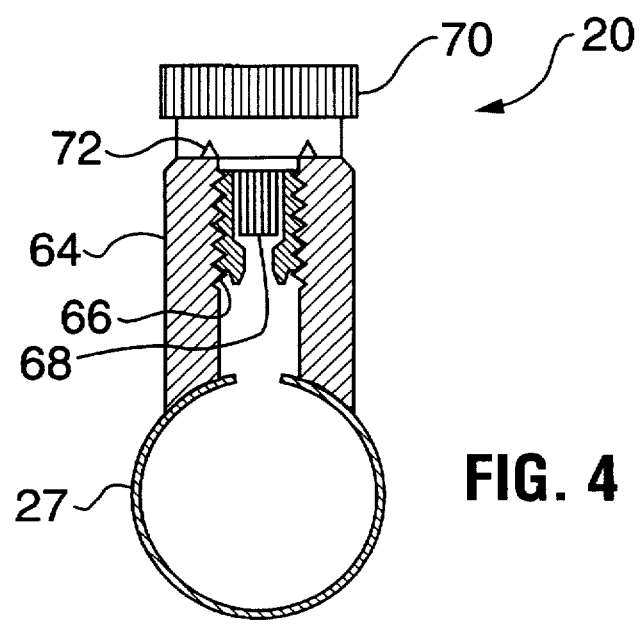
FIG. 4 is a cross-sectional view of the spray nozzle and spigot.

Referring to FIG. 4, each spray nozzle 20 assembly consists of a stainless steel spigot 64 hand welded to a ½ inch diameter stainless steel circular tube 27. The open end of the spigot 64 has threads 66 which register with outside threads of nozzle 70. An O-ring 72 mounted in a groove in the bottom face of nozzle 70 compresses against the top surface of the spigot 64. A piston 68 is slidably mounted in the nozzle 70 so that it forces incoming water to pass around the piston 68 before exiting the orifice in response to the application of pressure in the interior of the spigot 64. With the above arrangement changing a nozzle simply requires unscrewing the old nozzle and screwing in a new one. The nozzles are oriented to align with direction of flow of the gas particulate.

Figure 5:
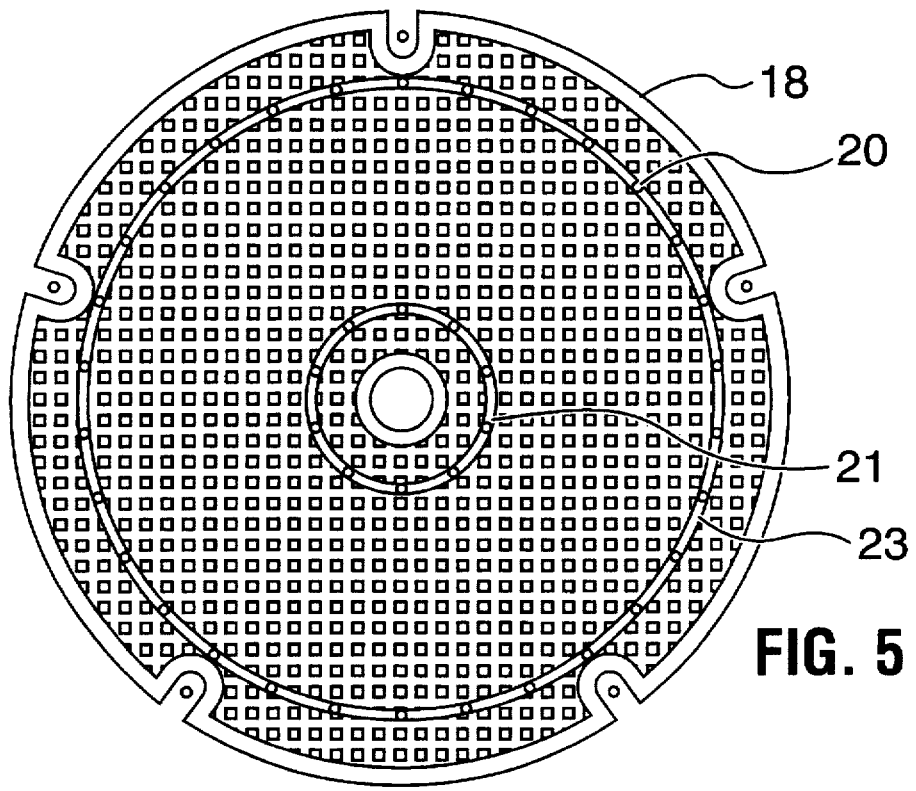
FIG. 5 is a top view of one of the perforated baffle plates.
Figure 6:
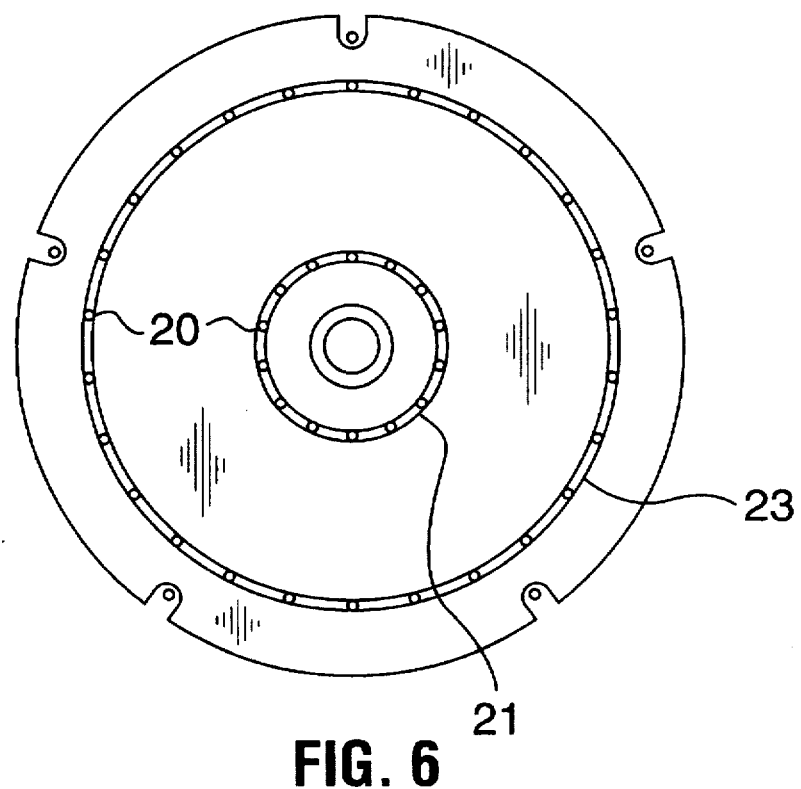
FIGS. 6 to 10 are top views of the baffle plates showing the inner and outer tubular rings on each baffle plate.
Figure 7:
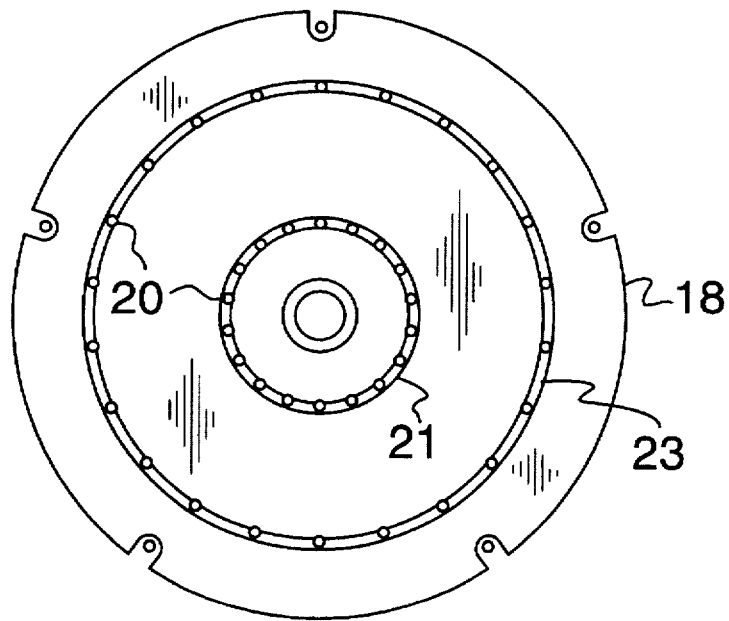
Figure 8:
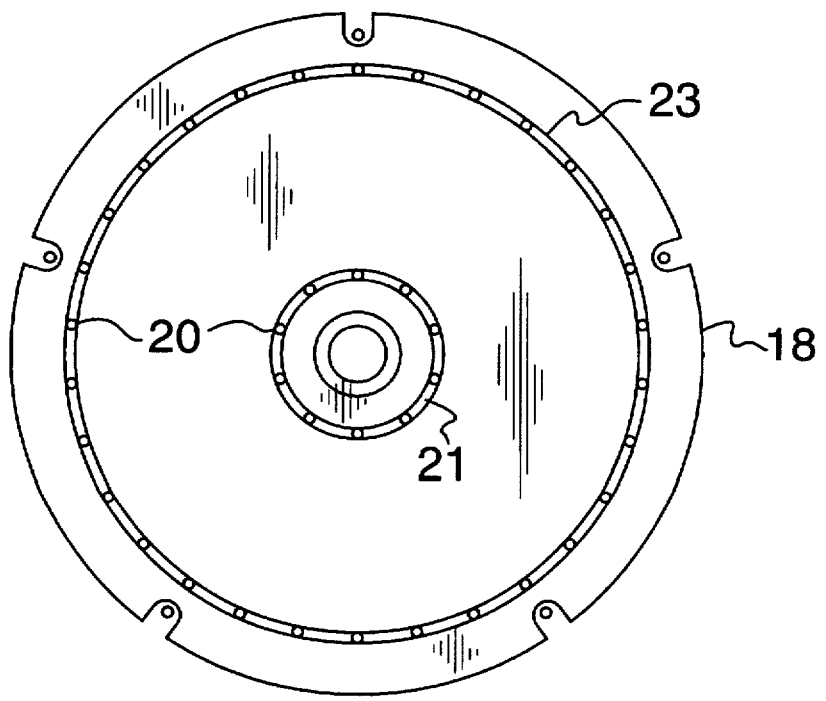
Figure 9:
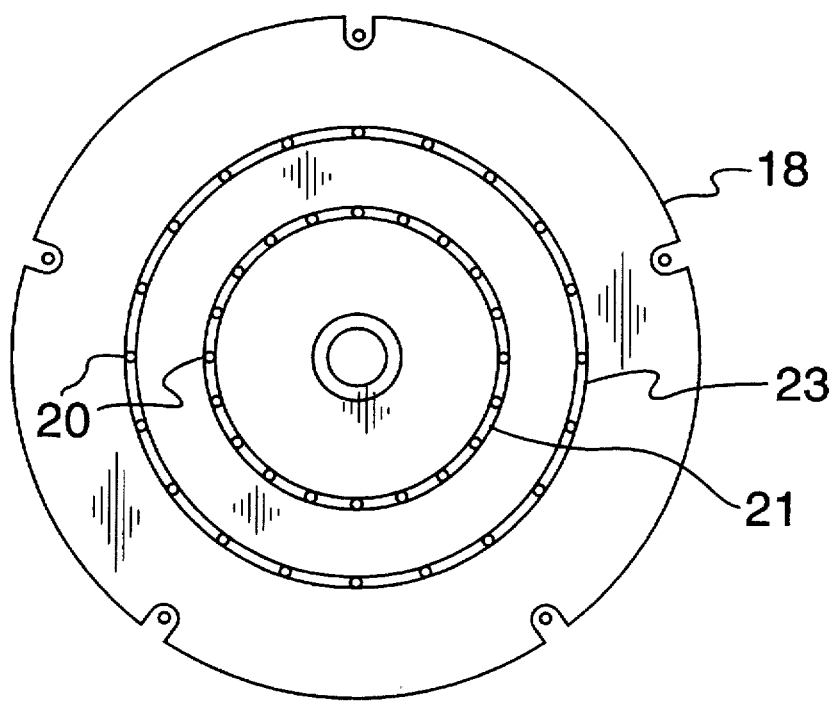
Figure 10:
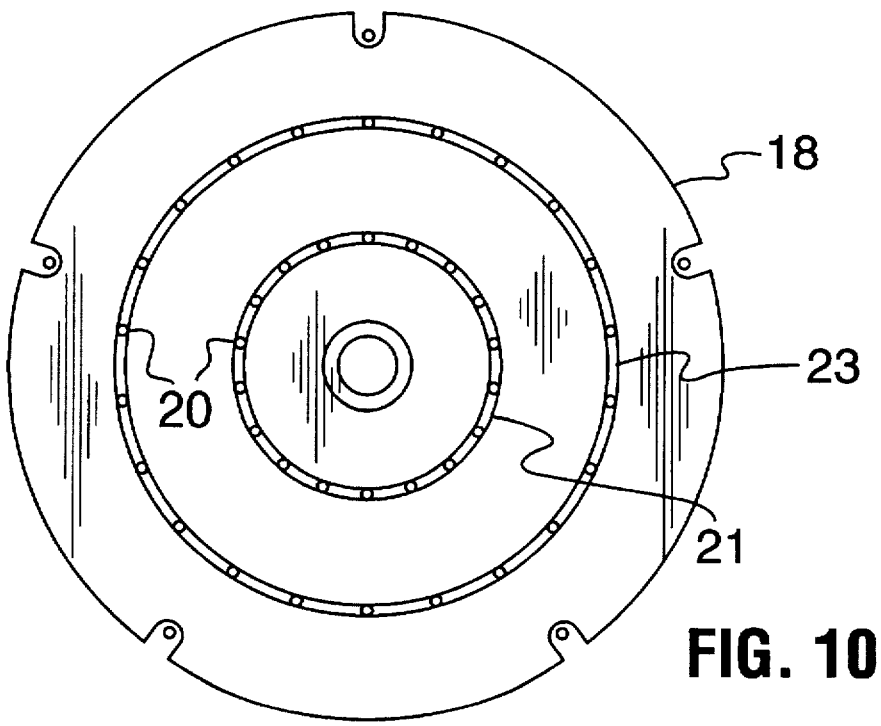

Referring to FIG. 5 the baffle plate 18 is stainless steel perforated with ¼ inch×½ inch openings with the centers of adjacent openings spaced ¼ inch×½ inch. Each baffle plate has five radially directed U-shaped slots around its periphery which are designed to accommodate vertical tubing running between plates to connect inner 21 and outer 23 tubular rings with pressurized water from the fog pump 32. FIGS. 6 to 10 show the radial spacing of the nozzles 20 affixed to the inner 21 and outer 23 tubular rings for the different diameters.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A misting assembly for an exhaust gas scrubber tower, comprising:
   (a) an elongated central member;
   (b) a plurality of perforated baffle plates affixed to said elongated central member at spaced apart distances thereto such that the perforations from each baffle plate are out of alignment with those of the next higher baffle plate;
   (c) an inner tubular ring and an outer tubular ring affixed to each baffle plate wherein the diameter of the inner tubular ring and of the outer tubular ring are different from the diameters of the inner and outer tubular rings of the other baffle plates; and
   (d) spray nozzles affixed to each ring at regular radially spaced apart locations around each of said inner and outer rings such that the integrated density of fog generated by said spray nozzles over all of said baffle plates is substantially uniform.

2. A misting assembly according to claim 1, wherein said spray nozzles are aligned in the direction of flow of gas when flowing upwardly through the assembly.

3. A misting assembly according to claim 1, wherein spigots are welded to each of said inner and outer rings and said nozzles are removably, threadedly coupled to said spigots.

4. A misting assembly according to claim 1, wherein said spray nozzles operate at a pressure and have a nozzle orifice such that they emit water particulates less than 30 microns in diameter.

5. A misting assembly according to claim 4, wherein said spray nozzles have a nozzle orifice with a diameter in the range of 0.004 to 0.008 inches and wherein the water pressure is in the range of 600 to 2,000 psi.

6. A misting assembly according to claim 1, including a mist eliminator plate atop an uppermost one of said baffle plates to condense any mist moving upwardly at a top of said misting assembly.

7. A gas scrubber, comprising:
   (a) a gas tower;
   (b) a misting assembly mounted inside said gas tower, said misting assembly including:
      (i) an elongated central member;
      (ii) a plurality of perforated baffle plates affixed to said elongated central member at spaced apart distances thereto such that the perforations from each baffle plate are out of alignment with those of the next higher baffle plate;
      (iii) an inner tubular ring and an outer tubular ring affixed to each baffle plate wherein the diameter of the inner tubular ring and of the outer tubular ring are different from the diameters of the inner and outer tubular rings of the other baffle plates; and
      (iv) spray nozzles affixed to each ring at regular radially spaced apart locations around each of said inner and outer rings such that the integrated density of fog generated by said spray nozzles over all of said baffle plates is substantially uniform;
   (c) an exhaust fan mounted atop said gas tower operative to draw gas up through said tower and out the top; and
   (d) a fog pump coupled to a water source and having an outlet coupled to said inner and outer rings and operative to develop an outlet pressure in the range of 600 to 2000 psi.

8. A gas scrubber according to claim 7, including a plurality of zone valves intermediate the outlet of said fog pump and each of said inner and outer rings on said baffles coupled to a corresponding one of said zone valves so that water can be supplied selectively to respective ones of said baffle plates.

9. A gas scrubber according to claim 7, including a sump tank located at a bottom of said tower, a recirculating pump coupled to an outlet of the sump tank, a filtration system coupled to an output of said recirculating pump, a water storage tank having an outlet line coupled to said fog pump and an inlet coupled to an outlet of said filtration system.

10. A gas scrubber according to claim 9, including a makeup water line coupled to said water storage tank to supply water lost through an exhaust of said tower and leakage.

11. A gas scrubber according to claim 10, including an injector pump coupled to a source of liquid additive and having an output coupled to said makeup water line.

* * * * *

UNITED STATES PATENT AND TRADEMARK OFFICE
CERTIFICATE OF CORRECTION

PATENT NO. : 5,593,469
DATED : January 14, 1997
INVENTOR(S) : Steve Crawford

It is certified that error appears in the above-indentified patent and that said Letters Patent is hereby corrected as shown below:

Title page, item [73], Assignee: should read-- MEC Systems Inc.--.

Signed and Sealed this

First Day of July, 1997

Attest:

BRUCE LEHMAN

Attesting Officer

Commissioner of Patents and Trademarks